United States Patent [19]
Storck et al.

[11] Patent Number: 5,434,395
[45] Date of Patent: Jul. 18, 1995

[54] METHOD AND DEVICE FOR EFFECTING A TRANSACTION BETWEEN A FIRST AND AT LEAST ONE SECOND DATA CARRIER AND CARRIER USED FOR THIS PURPOSE

[75] Inventors: Jean R. Storck, Mougins; Pierre M. Combaluzier, Vallauris, both of France

[73] Assignee: Jean-René Storck

[21] Appl. No.: 940,876

[22] PCT Filed: May 3, 1990

[86] PCT No.: PCT/FR91/00373
§ 371 Date: Dec. 30, 1992
§ 102(e) Date: Dec. 30, 1992

[87] PCT Pub. No.: WO91/17528
PCT Pub. Date: Nov. 14, 1991

[30] Foreign Application Priority Data
Mar. 5, 1990 [FR] France .................. 90 05562

[51] Int. Cl.⁶ .............................................. G06K 5/00
[52] U.S. Cl. ....................... 235/380; 235/379; 360/2
[58] Field of Search ............ 235/379, 380, 382; 360/2; 340/825-834

[56] References Cited

U.S. PATENT DOCUMENTS

| | | | |
|---|---|---|---|
| 4,277,837 | 7/1981 | Stuckert | 235/379 |
| 4,305,059 | 12/1981 | Benton | 235/379 |
| 4,450,535 | 5/1984 | de Pommery et al. | 364/900 |
| 4,454,414 | 6/1984 | Benton | 235/380 X |
| 4,634,845 | 1/1987 | Hale et al. | 235/379 |
| 4,709,136 | 11/1987 | Watanabe | 235/379 |
| 4,800,543 | 1/1989 | Lyndon-James et al. | 368/10 |
| 4,882,474 | 11/1989 | Anderl et al. | 235/382 |
| 4,885,788 | 12/1989 | Takaragi et al. | 235/382 X |
| 5,175,416 | 12/1992 | Mansvelt et al. | 235/380 X |

FOREIGN PATENT DOCUMENTS

| | | |
|---|---|---|
| 0355372 | 7/1989 | European Pat. Off. |
| 0049650 | 9/1981 | France . |
| 2604275 | 9/1986 | France . |
| 0329497 | 1/1989 | France . |
| 8300062 | 9/1983 | WIPO . |

OTHER PUBLICATIONS
French Search Report.

Primary Examiner—Donald Hajec
Assistant Examiner—Jeffrey R. Filipek

[57] ABSTRACT

A plug-in data carrier includes a processor, a program memory connected to the processor, and a dedicated memory connected to the processor. The dedicated memory is divided into a plurality of regions including a region for controlling and managing the operation of a transaction device, which is a device independent of the plug-in data carrier. The transaction device includes a first contact section which establishes electrical contact with the plug-in data carrier, a second contact section which establishes electrical contact with another data carrier, a first memory section inputting and outputting data to the plug-in data carrier via the first contact section, a second memory section inputting and outputting data to the another data carrier via the second contact section, and an interfacing circuit. The interfacing circuit identifies, under control of the plug-in data carrier, whether the another data carrier is compatible with the plug-in data carrier, and controls data transfer between the plug-in data carrier and the another data carrier via the first and second memory sections under overall control of the plug-in data carrier when the another data carrier is identified as compatible with the plug-in data carrier.

38 Claims, 8 Drawing Sheets

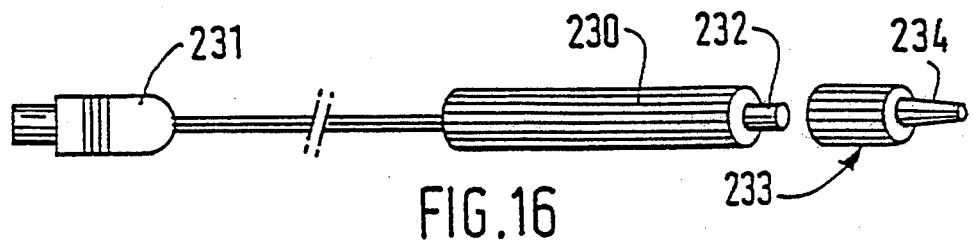
FIG. 16
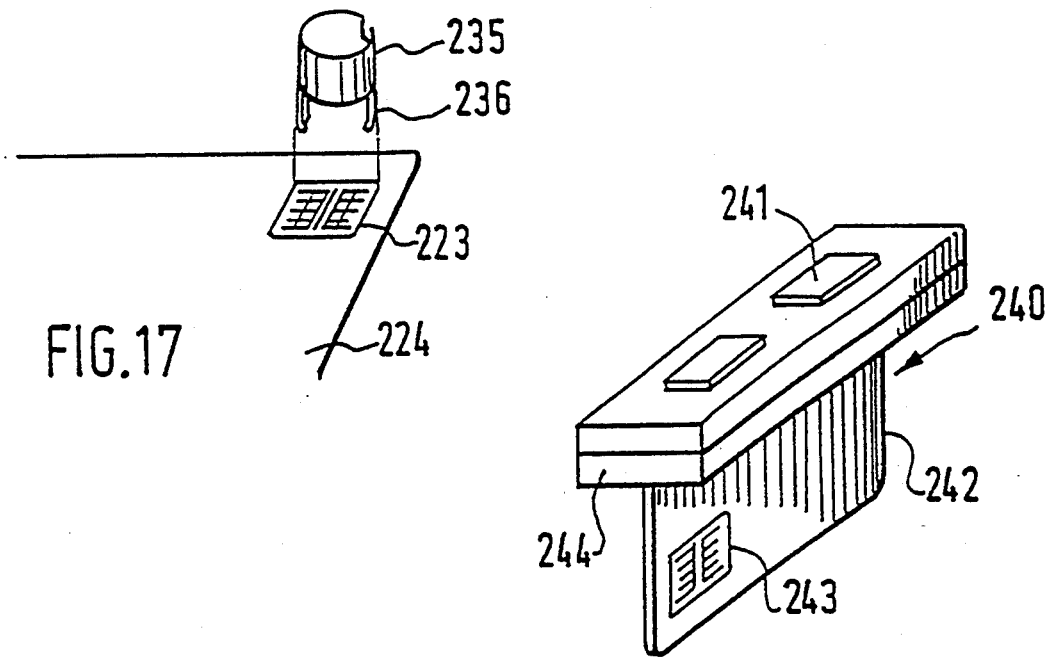
FIG. 17
FIG. 18
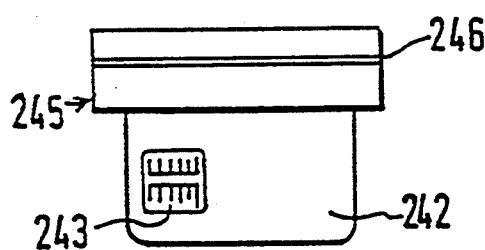
FIG. 19

METHOD AND DEVICE FOR EFFECTING A TRANSACTION BETWEEN A FIRST AND AT LEAST ONE SECOND DATA CARRIER AND CARRIER USED FOR THIS PURPOSE

BACKGROUND OF THE PRESENT INVENTION

The present invention relates to a method for effecting a transaction between at least one first plug-in data carrier incorporating a microcircuit, said carrier being of the type commonly referred to as an IC memory card or a microprocessor card, and at least one second data carrier, comprising at least the steps of setting up a relation between said carriers, reading said first data carrier, identifying the compatibility of said first data carrier with the second carrier and transferring data from one of said carriers to the other during a transaction between said first and second carriers via an interfacing circuit. More in particular, the invention relates to transactions in the field of intelligent cards, commonly called chip cards or smart cards, also referred to as microcircuit cards. The invention also relates to devices and accessories for carrying out the method according to the invention. It also relates to a plug-in data carrier incorporating a microcircuit enabling said method to be carried out.

Since the filing of the first patents in the nineteen seventies, the smart card has experienced considerable success and has come into widespread use, accompanied by a parallel growth in its technical capabilities and potential applications.

In this specification we shall use the term "microcircuit card" in preference to the terms "IC memory card", "smart card", or "microprocessor card" commonly employed to describe the same object. A microcircuit card can be defined, in the most general way, as a portable device for acquiring and storing information and/or data which is endowed with its own intelligence and includes provisions for identification and protection. The cards we are dealing with here are defined, at least as regards their physical format, by the ISO 7810 standard that specifies the physical structure of a type of card, generally referred to as a credit card. Another ISO standard, number 7811, defines, among other things, the position of the magnetic tracks currently employed for cards of a hybrid nature, particularly those intended for banking applications. Pursuant to the recommendations of the French Standardizing Association, AFNOR, ISO issued a "Draft International Standard"—DIS 7016 which not only defines the physical characteristics of the card such as those found in the ISO 7810 standard, but also defines the surface profile of the microcircuit contacts, along with numerous other parameters essentially relating to reliability and physical strength of the microcircuit. This provisional standard also determines the majority of the microcircuit's electrical parameters, notably the signals and protocols used in its dealings with the outside world, initialisation functions, transmission formats and standards, whereas a definitive choice between synchronous and asynchronous transmission has not yet been made.

While still on the matter of standards, three possible physical locations of the microcircuit on the carrier are currently accepted, a position at the top left hand corner which was initially chosen by the AFNOR, a position at the bottom left which should become the standard in France as from 1990 and a left hand middle position preferred by the ISO.

It is appropriate to make a distinction between passive cards which constitute the type of card in current use and which one could categorise as being a sort of portable information or data carrier, a read/write terminal being necessary in order to be able to read the data contained therein, and a new generation of cards which can be categorized as being active, incorporating their own power source, and their own display and keyboard; the extremely thin battery, rendered necessary in order to conform to ISO standards, currently preventing such cards becoming available. Although this invention is oriented towards the "passive" cards currently available, the means employed in the present invention are perfectly capable of handling both types of cards, whether they be active or passive.

In its use as a data carrier, the microprocessor card has experienced an almost explosive multiplication of its applications, starting out from the traditional fields of electronic money, and above all banking applications, followed by its use as a phone card, to then go on to applications as varied as tickets for public transport or cinemas, carriers for storing personal medical files, means for vehicle identification, portable parking meters, just to mention a few of the current applications of the microcircuit card.

In parallel with this, and in line with general developments in the memory and integrated circuit fields, the storage capacity of microcircuit card memories have undergone an almost exponential growth, starting out from the original 2 Kbytes progressing 64 Kbytes a few years ago to reach, with the addition of mass storage under the microcircuit, present day capacities of more than 100 Kbytes and up to 800 Kbytes with certain memory techniques currently capable of being implemented. The technology employed has followed a parallel evolution, going on from EPROMs (erasable programmable read only memories) to EEPROMs (electrical erasable programmable read only memories) in combination with the widespread use of current CMOS or even HCMOS technology.

Finally, the question of the security of the data stored in the card and during transmission thereof over a telecommunications network is a major preoccupation of suppliers of such cards. This preoccupation has resulted in efforts which now offer a quite remarkable security of the data, when compared to other means of storage. Thus, separating the memory, generally, into at least three zones, an open zone, a confidential zone and at least one secret zone, along with numerous other techniques such as coded customization of the memory areas, the possibility of selectively accessing specific information through the implementation of different levels of recognition, the use of multiple recognition codes, cyclic or inter-zonal movement of the information, along with secure or encrypted transport of the information during transmission thereof over a telecommunications network have led to results, and to possibilities, which are absolutely remarkable. It should nevertheless be noted that the dominant position of banking groups in their role of current distributors of the microcircuit card, and their preference for a product the security of which is irreproachable, nevertheless accompanied by somewhat limited functionality, is currently hindering the development of potential applications of the microcircuit card.

Full use of the possibilities of the microcircuit card is also being hindered by the type of hardware with which it is currently used, manufacturers offering either hardware that is complex and extremely expensive such as automatic teller machines and their associated servers, or small-size relatively simple equipment for use, for example, as a point of sale terminal. This latter equipment is customized for a specific applications and is completely incapable of following the evolution of the currently available possibilities of the microcircuit card, and even more so future evolutions which are likely to follow an exponential development curve, at least over the next ten years. In brief, the microcircuit card, in its function as a portable data carrier in combination with an excellent level of protection and employed in combination with servers of enormous complexity and high microcircuit card and its inherent intelligence, this cost, operating in relatively unadaptable configurations, does not make use of the present possibilities of the under-utilisation being likely to become even more pronounced over the next few years.

WO-A-8303018 (notably page 5 line 12 to page 11 line 6); EP-A-0 049 650 (notably page 33 line 15 to page 39 line 6 and claims 9 to 13) and JP-A-61 48086 are constitutive of the state of the art in the field. They relate to systems comprising different means including data processing means, dialog means, information processing means, means for setting-up an operation and a data carrier.

WO-A-8303018 relates to a device providing improved security in financial transactions between, for example, a retailer and a customer in a conventional point-of-sale system, in which the system interrogates the user on a selected identification feature which, preferably, is chosen in a random fashion.

EP-A-0 049 650 describes a system for distributing objects, such as an automatic teller machine, with means enabling the security of transaction to be improved, through, notably, the simultaneous use of a first portable card means which dialogs with information processing means, and a second portable card means, the latter including enabling functions vis-a-vis the first portable card.

JP-A-61 48086 does in fact describe a connector enabling data to be transferred between a master card and a slave card, the connector including means suitable for determining which of the two cards is the master card.

In this present description and in the claims which result therefrom, the term "data" essentially means digital data, it however being understood that the term should not be limited to this aspect and that the term also covers analog applications and hence analog data.

Moreover, data should be taken to cover information able to transferred or acquired along with information able to be copied.

SUMMARY OF THE PRESENT INVENTION

One of the objects of the present invention is hence to enable full use to be made of the multiple possibilities of the microcircuit card.

Another object of the invention is to allow the intelligence of a relatively complex server to be incorporated in the actual microcircuit card.

One main object of the invention is also to enable one or several microcircuit cards to dialogue with each other.

Another object of the invention is to allow full use to be made of the possibilities of the microcircuit card during communications with another system such as an interactive on-line terminal, a microcomputer or any other data processing system whatsoever.

Another principal object of the invention is to enable certain selected data stored in the memory of a microcircuit card to be delegated to another microcircuit card.

Another object of the invention is to provide very simple equipment allowing communication to take place between two or several microcircuit cards, said equipment remaining relatively transparent during said communication.

A further object of the invention is to provide equipment able to follow the evolution of the possibilities and functionalities of microcircuit cards without requiring modification, and without any limit.

The invention has the further object of enabling highly customized microcircuit cards to be provided using delegation carried out starting from one or several master microcircuit cards.

Another object of the invention is to provide means for implementation of an instantaneous payment system without the use of physical money through the transfer of tokens representative of a fiduciary value from a debitor's card to a creditor's card.

One important object of the invention consists in the provision of an intelligent connector which is capable of being recognised by, and of recognising, other intelligent element that are participating in a modular-type system.

Yet a further object of the invention is to provide pocket-size equipment capable of carrying out, in an extremely simple manner, transactions between two or several microcircuit cards.

Yet a further object of the invention consists in providing equipment able to be connected to network carrying data likely to occur in a transaction between two microcircuit cards.

Yet a further object of the invention is to provide a range of intelligent products capable of being interconnected in a modular fashion and without limit.

A further object of the invention is to provide standard hardware of a simple design the function of which is limited to enabling access to be had to the authorized regions of microcircuits on cards, the hardware receiving its intelligence from one or several microcircuit cards which are connected thereto.

The invention finally also has the object of providing a range of intelligent accessories able to be integrated into a modular system for a multiplicity of applications such as home automation.

The invention further has the advantage of enabling a person owning or in possession of a card to read the data contained therein. Obviously, this can mean that such information cannot be read until the owner has entered a personal identification number code. Any other operation carried out by the use of the card may necessitate the owner introducing said code.

These and other objects are achieved in a method for effecting a transaction between at least one first plug-in data carrier incorporating a microcircuit, said carrier being of the type commonly referred to as an IC memory card or a microprocessor card, and at least one second data carrier, comprising at least the steps of setting up a relation between said carriers, reading said first data carrier, identifying the compatibility of said first data carrier with the second carrier and transferring data from one of said carriers to the other during a transaction between said first and second carriers via an interfacing circuit, the method being characterized in that it comprises the use for said first data carrier of a microcircuit carrier which contains all necessary data for carrying out said identification and for controlling and managing said interfacing circuit and said transaction.

According to one feature of the invention, the second data carrier can comprise a carrier which is also in the form of a plug-in microcircuit element, this second data carrier being able to receive data during a transaction only in the case where said first data carrier is authorized to send data thereto, the data actually transferred being able to be limited by defined degree of authorization.

According to another feature, the second data carrier can be a data carrier able to be adapted to correspond with the interfacing circuit and which constitutes part of a system that is independent of said interfacing circuit. Thus, the independent system can for example be an interactive on-line terminal that is in communication with another remote interactive on-line terminal with which another plug-in data carrier according to the invention can be in communication.

According to another feature, the interfacing circuit consists of communications means controlled by hardwired logic means, the hardwired logic means being exclusively controlled by data in the operating software stored in said first carrier, the functions of said interfacing circuit being limited to providing access to the data regions of said microcircuits, said access being authorized by the means for carrying out identification that are included in the first data carrier.

In line with another feature, the first data carrier is programmed in a manner which enables at least a part of authorized data to be transferred to the second data carrier, said transfer being conditional on choices imposed by a human operator or by at least one enabling element participating in said transaction, or a combination of the two, the existence and extent of said choices being determined by said first data carrier.

In accordance with another feature, the transaction is made conditional by signals which are external to said first and second data carriers and said interfacing circuit, the possibility of said transaction being conditional being determined by data in said operating program stored in said first carrier.

One optional feature provides for the first carrier to draw up a report of each transaction in which it has participated.

According to another feature, the second data carrier consists of a plug-in carrier provided with a microcircuit and authorized to receive data from at least one first carrier, and adapted to make the data that it has thus received secure, and to then be able to transfer or delegate, in its turn, a part of the data that it contains, said delegation being always subject to authorization contained in the data initially transferred from said first carrier and also being optionally subject to the control of a human operator and/or to the presence or absence of enabling signals, the extent of said control also being determined by the data initially transferred from said first data carrier.

The term "delegation" should be taken to means the ability of a first microcircuit card to partially allocate its authorizations, functions and data to a second microcircuit card or, in exceptional cases, to re-assign all of its authorizations, functions and data. For example, a debitor in a commercial transaction can delegate, from his card which is loaded with a certain number of tokens, part of said tokens to a creditor's card, the "value" of this second card increasing immediately by an amount equal to the sum involved and the "value" of the second card being simultaneously reduced. This second card can, in its turn, delegate a part of the sum thus transferred to a third card, and so on, instantaneous payments being made in each case without the use of cash.

A preferred manner of carrying out the invention comprises the steps of:

establishing a direct or indirect electrical contact with terminals of the microcircuit of the first plug-in carrier having a microcircuit;

establishing a direct or indirect electrical contact with terminals of the microcircuit of at least one second plug-in carrier, in order to establish a link, through said interfacing circuit, between said first and second microcircuits;

running an identification and access algorithm on the first microcircuit;

running an identification and access algorithm on the second microcircuit;

transferring the data resulting from the running of said algorithms to the interfacing circuit;

comparing, in said interfacing circuit, the results of the running of said algorithms by a method determined by said first plug-in carrier having a microcircuit;

determining if a transaction is possible on the basis of the results of said comparison;

sending, in the case where the transaction is recognized as being possible for both participants, possible activation signals to a means for human intervention in said transaction from said first plug-in carrier having a microcircuit to said interfacing circuit enabling a human operator to exercise a level of control over said communication means;

carrying out a transfer of data still under the command of said first microcircuit between the two microcircuits of the data carriers, the interfacing circuit only participating in said transaction as an interface providing means between the two carriers and as a means for two-way communication with a human operator or another signal source connected to the interfacing circuit.

The invention also provides a plug-in data carrier having a microcircuit comprising a plurality of dedicated memory regions comprising at least one region to which access is prohibited, a region holding accessible data, an identification region and a transaction region which is characterized in that said carrier includes a region of data for controlling and managing the operation of an interfacing circuit, the data of said region being able to be copied from said carrier onto another carrier with which it is compatible, and a region containing data information able to be copied by access thereto by delegation.

According to one feature, the data carrier includes a confidential zone to which access is obtainable by progressive coded steps.

According to another feature, the data carrier includes a data zone containing information able to be transferred or acquired.

According to a further feature, provision is made in the data carrier for a region containing program data which can be copied from one data carrier to another carrier with which it is compatible.

In another feature, the data carrier includes a region containing program data which can be fully transferred from one data carrier to another carrier with which it is compatible.

The invention also provides a device for carrying out a transaction between at least one first plug-in data carrier having a microcircuit and a second carrier, the device including means for establishing a direct or indirect electrical contact with a first plug-in carrier having a microcircuit and with at least one second carrier, an interfacing circuit for said first data carrier and said second data carrier, means for identifying said second carrier which respect to said first carrier, and means allowing, totally under overall control of said first data carrier, a transfer of data from one of said carriers to the other carrier.

According to one feature, the device includes display means for displaying elements of information relative to said transaction and/or means enabling a human operator to intervene in a transaction, as a function of options that are proposed to him.

According to another feature, the elements composing said display are generated by one of the microcircuit data carriers plugged-into said device.

In one embodiment, the device includes a liquid crystals display adapted to be activated and supplied with information by one of the microcircuit data carriers.

According to one feature, the keyboard can consist of a touch sensitive screen, the keyboard being able to be displayed thereon by data stored in a microcircuit data carrier, enabling the touch screen to display symbols and alphanumeric characters generated by at least one of the plug-in data carriers.

In another feature, a keyboard consisting of an external keyboard able to be connected to said device by means of a connector can be used.

The device according to the invention may optionally include supplementary means for reading magnetic stripe cards.

BRIEF DESCRIPTION OF THE DRAWINGS

Further aims, features and advantages will become apparent from the description which follows of various embodiments of the invention provided by way of non-limiting example and with reference to the drawings in which:

FIG. 16 shows a peripheral designed to be connected, by the connector in FIG. 12, to a device such as the one shown in FIG. 1, and constituting an analyser for entering into direct contact with microcircuits;

FIG. 17 shows a guide or centering ring ensuring that the tip of the analyser shown in FIG. 16 gets correctly centred;

FIG. 18 shows a first type of controller designed to be used with a device such as the one shown in FIG. 9 and having touch-sensitive keys;

FIG. 19 shows a controller similar to the one in FIG. 18 employing presence detection;

DETAILED DESCRIPTION OF THE EMBODIMENTS

Figure 1:
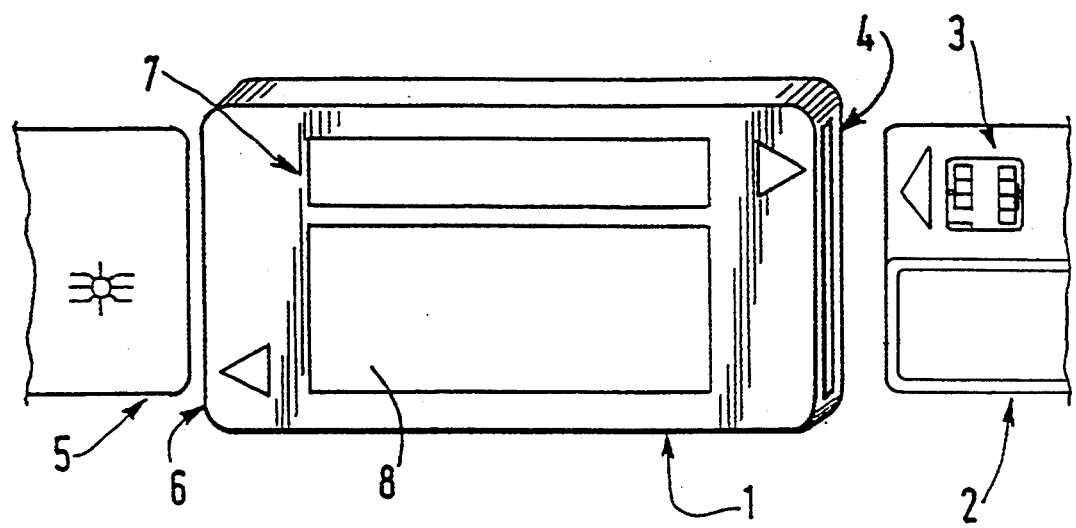
FIG. 1 is a diagrammatical view of an electronic pocket transaction device according to a first embodiment of the invention.

With reference now to FIG. 1, we shall describe a first embodiment in detail, illustrating several fundamental principles of the invention.

The transaction device shown in FIG. 1 generally indicated by reference numeral 1 is in the form of a small piece of equipment of a format similar to that of a pocket calculator. It is designed to receive two plug-in microcircuit carriers 2 and 5, of a standardised format, substantially corresponding to the format of a credit card, one of said microcircuit carriers or cards being able to be one of the accessories such as those illustrated in FIGS. 12, 14, 15 or 20, for example. The cards are inserted laterally from the left and the right, or from the top or bottom of the casing of the equipment 1 through an entry slot or throat 4 and 6 inside which they are guided, retained and locked in place by means that are not shown on this figure. The device is perfectly symmetrical and the cards can be inserted into either one of the two slots.

The equipment also includes means, which are also not shown, for establishing electrical contact, which generally is direct but which also can be indirect, in other words contact being established through electromagnetic or capacitance coupling, with the microcircuits such as the one shown at 3 on the right hand side in FIG. 1. In the version being considered here, the slots 4, 6 are able to receive, and their electrical contacts accept, cards following the AFNOR standard with the chip at the top or the bottom, or the ISO standard with the chip in a midway position. In one embodiment, the equipment can also receive cards bearing magnetic stripes in a slide-through or "swipe" slot specially designed for this function.

The card, along with its contacts land interfaces with the outside world are, as has been said, either standardised or are in the process of being standardised, and despite the considerable increase in the memory capacity envisaged for certain applications of the present invention, these contacts and their electrical specifications constitute, at least "de facto" standards. Despite the envisaged growth in the memory and processing capabilities of the chip incorporated into such cards, its basis structure and electrical interfaces, which are illustrated in FIG. 3, are likely to be adhered to over a relatively long period.

Figure 2:
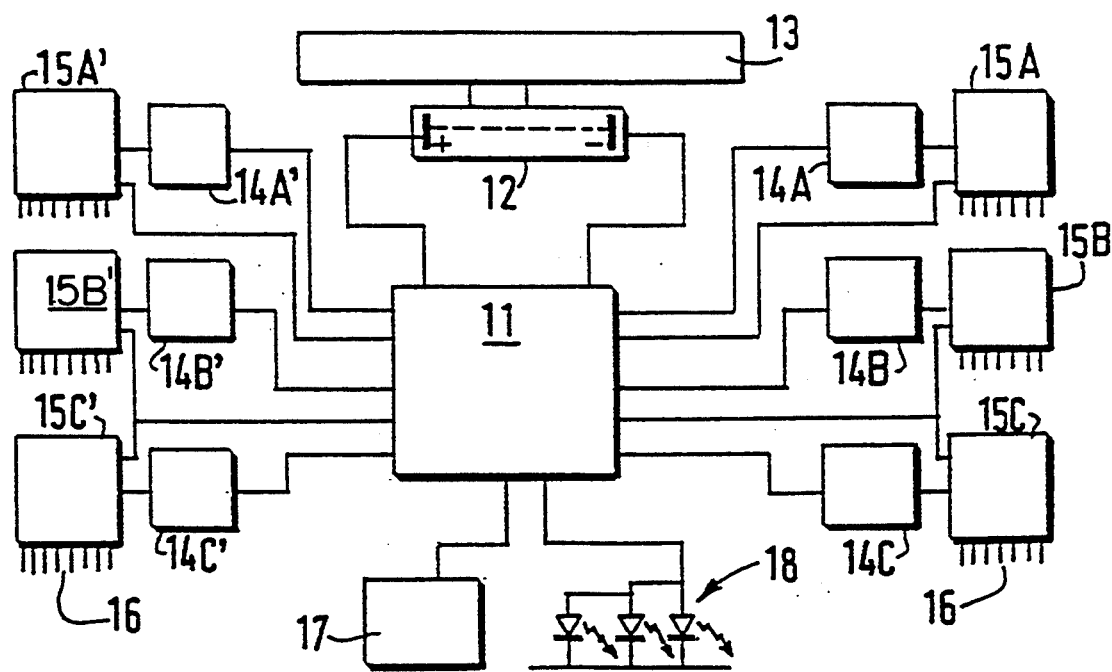
FIG. 2 is a block diagram showing the main function of blocks of the device in FIG. 1.
Figure 3:
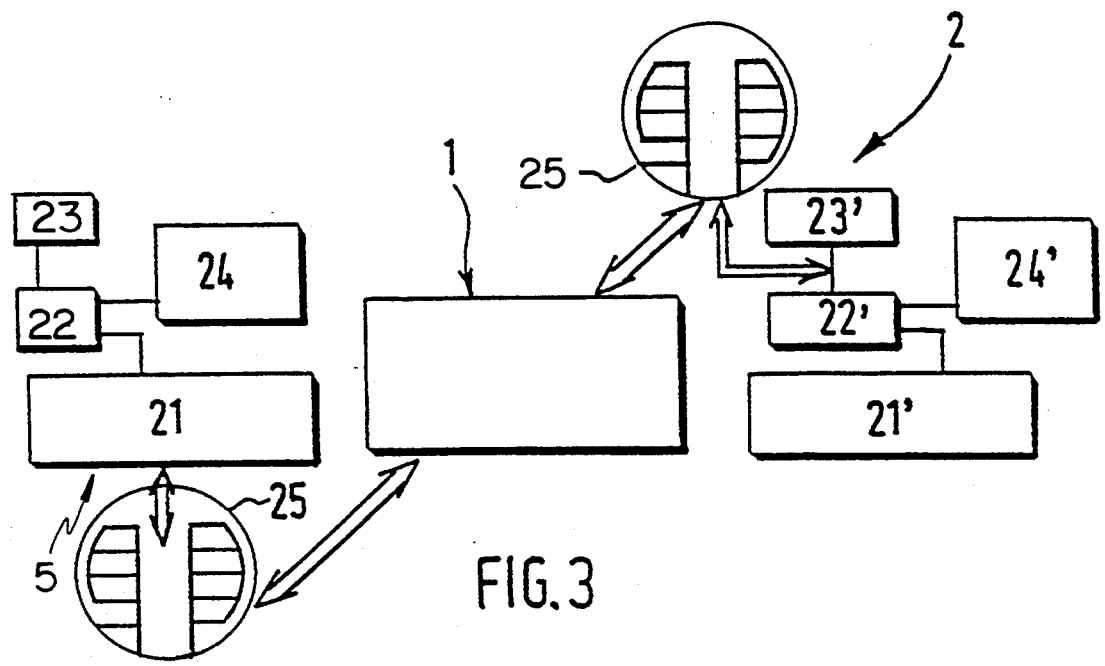
FIG. 3 is a highly schematic illustration of a transaction between a first microcircuit card and a second microcircuit card, carried out using the device in FIG. 1.

The structure of a microcircuit, and here that of the present smart bank card is illustrated in FIG. 3. Obviously, if such a bank card were to be introduced into the transaction device according to the invention with the intention of carrying out a transaction on the basis of information held in its chip, such a transaction would be refused, this fact being indicated to the user by means for example, of one of the LED diodes 18 in FIG. 2 lighting up and by the card being ejected, as such a card would not be in possession of the necessary software which, among other things, would enable device 1 to operate. This illustrates one fundamental aspect of the invention: whether or not a card can or cannot be used as a "master" card in the device according to the invention is entirely determined by the supplier of this "master" card. In the same way, only the supplier of said master card is able to determine which data are able to be transferred to another card, and which data are not able to be transferred. It is also obvious that if such a bank card were to either accidentally or intentionally be introduced into the equipment with the intention of transferring data to it, this transaction would also be refused and the card ejected, for example by release of the card retention means, as the card would not be recognized as authorized to receive data after the master card, which we shall suppose to be valid and introduced into the other slot of the equipment, had run its verification algorithms.

The structure of the cards illustrated in FIG. 3 has hence only been adopted by way of an example of the general structure of a microcircuit, for example microcircuit 3 in FIG. 1 carried by the cards suitable for use with this present invention. If the left hand card 5 is considered, the microcircuit carried therein comprises a data memory 21, generally divided into several zones or regions, an arithmetic and logic unit or microprocessor 22, a data memory 23 and a program memory 24. The regions of data memory 21 include at least one region to which access is prohibited, a region holding accessible data, an identification region and a transaction region which is characterized in that said carrier includes a region of data for controlling and managing the operation of an interfacing circuit, the data of said region being able to be copied from said carrier onto another carrier with which it is compatible, and a region containing data information able to be copied by access thereto by delegation. Certain applications designed to be handled by the means of the invention envisage a significant increase in the present day capacity of microcircuit memories, notably as regards data memory 21. The microcircuit communicates with the outside world via a connector 25, the profile of which, as has been said above, is in the process of being standardized. It can be imagined that this electrical interface will be maintained despite the large increase in the microcircuit's capabilities. At present, and still with reference to FIG. 3, the function of two of the eight contacts is not defined, but these contacts are generally necessary for reprogramming activities. A third contact constitutes a serial input/output for data, a fourth contact receives a clock signal, a fifth contact and an eighth contact receive the electrical power supply for the microcircuit, a sixth contact provides the possibility of initialising or resetting the microcircuit and a seventh contact is a ground plane. As has been said, the transaction device in FIG. 1 is fitted with known means, not shown in the figure, for setting up a reliable electrical contact with the microcircuits of each one of the cards 2 or 5.

Transaction device 1 also includes its own battery power supply, notably using lithium batteries, capable of supplying around 24 volts necessary, in particular, for the programming activities of one of the cards during a data transfer. The device 1 can also include a liquid crystal display 7 allowing various messages intended for the user to be displayed, and also a keyboard, at position 8, which can have various forms such as the touch screen shown in FIG. 22. Position 8 may however also be fitted out simply with several keys enabling one or several options proposed to the user to be validated.

FIG. 2 illustrates certain general principles of the hardware organization of a transaction device such as the one in FIG. 1, in which reference 11 designates a pre-programmed communication unit which includes means for running automatic routines capable of recognising the signals sent from the processing circuits of cards, and those coming from their EPROM and EEPROM memories. Communication unit 11 is connected to a circuit 13 for detecting introduction of a card which starts up power supply 12.

Ranged in a symmetrical fashion in correspondence to each one of the slots 4 and 6 of FIG. 1, the device includes elements 15a, 15b, 15c; 15a', 15b', 15c' fitted with contacts 16 designed to set up the electrical and transactional interface between each one of the cards 3 and 5. The three interfaces 15a, 15b, 15c; 15a', 15b', 15c' are each able to set up a relation between all standardised cards currently available, notably AFNOR cards with the microcircuit at the bottom, AFNOR cards with the microcircuit at the top and ISO cards with the microcircuit in a midway position.

Between each one of the interfaces 15, a RAM memory 14a, 14b, 14c; 14a', 14b', 14c' carrying out a checking and identification function is connected to communication unit 11.

This simplified diagram employs three LED diodes 18 for identifying the various stages in a data transfer between, for example, card 5 and card 2. Such diodes display, for example incompatibility between the two cards by a red light, the running of a read sequence by the lighting up of a yellow LED and loading of data by a LED of a different color lighting up. The device also includes element 17 by means of which the operator can operate on the transfer, for example for starting it.

The operation of the transaction device illustrated by way of example in FIG. 12 will now be described.

Introducing a card into any one of the slots in the transaction device 1 of FIG. 1 will switch the equipment's power supply 12 on via a card detector 13. Communication unit 11 sends a signal to the card's microcircuit to start transferring its access protocol into the RAM memory 14a', 14b' or 14c' to which it is connected. A failure for such transfer to occur could lead to the card being ejected. The equipment now awaits the introduction of a card into the other slot, and upon said introduction, the access protocol contained in the microcircuit of this second card will be loaded into RAM memory 14a, 14b or 14c to which the microcircuit is connected. Here, communication unit 11's task is limited to carrying out comparison of the data contained in the two protocols, the criteria for compatibility being always determined by the microcircuit of the card which is the "master" of the operations during the envisaged transaction; if the criteria are satisfied, the "master" card ascertains that transaction between the two cards is possible. The communication unit is now responsible for setting up a link between the serial output from the first card and the serial input of the second card, the actual process of transfer being under the control of the card which is the "master" in the transaction.

FIG. 3 illustrates, in a highly diagrammatical manner, a transaction between the first microcircuit card 5 which constitutes the "master" card and a microcircuit card 2 which is intended to receive a part of the information contained in card 5. It should be remembered that communication device 1 in FIG. 3 takes the form of a practically transparent interface constituting the intermediary between card 5 and card 2 but which does not intervene in the transaction except by virtue of its relatively transparent interfacing function. All the information relating to the data able to be transferred, the options that are available to the user during a transaction, the security process implemented during a transaction and, briefly stated, all the intelligence authorizing the transaction is contained in the master card 5, communication device 1, apart from its pre-programmed recognition and relational capabilities being completely enslaved and under the control of the "master" card 5.

The purpose of the transaction between card 5 and card 2 is to transfer a clearly defined part of the data contained in the data memory 21 into one or several determined regions of the memory of microcircuit card 2. One could consider card 2 as being "virgin" but, in fact, this card already includes some programming at least in the form of an authorization protocol enabling it to receive data and to optionally classify such data in a correct manner. The delegation possibilities available to card 5 are programmed in an indelible manner in this master card 5. The card may also contain a series of options. The user can then only exercise a choice on the basis of these options which may be present and proposed by the programming of card 5. The options are displayed by transaction device 1 and simply require the user to validate one or several options. At the end of the transaction, the card 2 is ready for use in an installation that corresponds to its capabilities and functionalities, the data that it contains and the security modes implemented having been defined right from the outset by master card 5. Obviously, a part of the data contained in the data memory of card 2 could be transferred to card 5.

One example of the use of transaction device 1 is to credit the data memory of card 2 with a certain amount of money which is simultaneously debited from the data memory of card 5. This involves a transfer of data that are able to be transferred from card 5 to card 2 with the corresponding data initially held in card 5 disappearing. Obviously, a transaction in the reverse direction could also be possible, in other words transfer of data from card 2 to the data memory of card 5. Another possibility of using transaction device 1 is to allow an item of data held in the data memory of card 5, and able to be copied, to be copied into the data memory of card 2.

Obviously, other operations apart from financial ones are provided for. For example, a card can, in addition to other data, contain data for controlling a lock, for example an automobile lock, and also the steering wheel lock and the ignition key lock enabling the engine to be started. Such data can be held in memory in such a way that it can be copied, for example copied onto another microcircuit card, which can further receive data comprising commands for limiting the automobile's engine speed, or may be incapable of being copied.

Another application of this system can consist in debiting a fixed amount from every card which is introduced into the transaction device. For example, such an application could be set up to pay for a trip on public transport with the card only being debited by the amount indicated on a meter or any other means.

These examples are provided by way of illustration and are by no means limiting.

Figure 4:
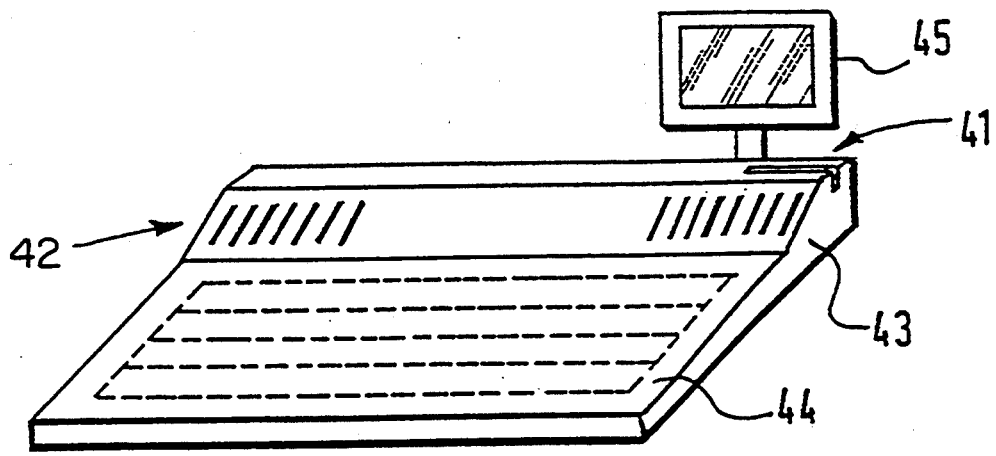
FIG. 4 shows a keyboard for computer hardware fitted with several means for reading microcircuit cards.
Figure 5:
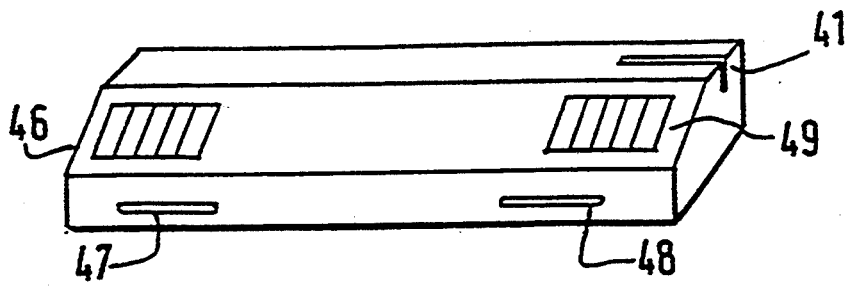
FIG. 5 shows an interface fitted with means for reading microcircuit cards, for insertion between a standard keyboard and an item of computer hardware.

FIGS. 4 and 5 show a further embodiment of the device according to the invention able to carry out transactions between one or several cards introduced into one of the fields provided for this purpose, for example 42 or 46, and one or several cards introduced into the other field 43 or 49. Thus, starting out from one master card, it is possible to simultaneously assign a level of authorization to one or several "slave" cards and to modify this at any time. It is also possible to divide up an authorization level between two or several slave cards which will then need to be used in a complementary manner or simultaneously. It is thus possible to create, starting out from a single master card or several master cards, a plurality of slave cards these slave cards being originally "virgin" as defined above, and being inserted into the field 43 or 49. In the example considered, each of the slave cards will nevertheless be individually customized by introducing, during transfer, data originating, for example, from the keyboard illustrated in FIG. 4. Such introduction of data cannot however be carried out at will, but only within limits set down and available to the user by the programming of the master card or cards introduced into field 42, in the example considered.

Each field 42, 43; 46, 49 for introduction of microcircuit cards can be a dedicated or non-dedicated field. Preferably, the whole field is divided up into sub-fields indicated by different colours on the outer face, certain slots being, for example, intended for one or several master cards, and other fields being dedicated to one or several user cards, further fields being dedicated to control cards, other fields being dedicated to program cards, and further fields being dedicated to interface cards. This list is far from being exhaustive and all types of card, for example cards for guiding the user or program cards providing an access key to complicated software and simplifying the use of such software by novice users, cards containing training programs and, in general, all types of information able to be exploited can be made use of during transactions carried out by the transaction device.

The transaction devices shown in FIGS. 4 and 5 constitute multiple-transaction equipment between microcircuit cards, and hence constitute the basis of a multi-use system. Just like the transaction device illustrated in FIG. 1, the devices in FIGS. 4 and 5 receive their operating possibilities from microcircuit cards which are introduced into their card introduction fields. All of the transaction device's intelligence is hence derived from the possibilities offered thereto by the data stored in the microcircuits of the cards in use at any time. This device does nevertheless include a hardware structure, with associated hardwired logic.

The microcircuit introduction field provider illustrated in FIG. 5 constitutes a piece of equipment per se. It can be incorporated into the keyboard console illustrated in FIG. 4 or can constitute an independent device capable of being connected up to a conventional keyboard via its port 47, by means of a suitable connector. The device in FIG. 5 also includes an output 48 enabling it to be connected up to any other unit or system, optionally via a telecommunications line. It can hence be connected, for example, between the keyboard and the system unit of a microcomputer. The device also includes a slot 41 for reading standard magnetic stripe cards that follow the ISO standard.

The keyboard console of FIG. 4 is essentially made up of the equipment shown in FIG. 5 with the addition of a keyboard 44 which is substantially like the alphanumeric control keyboard used in a microcomputer or, in general, with any data processing or interactive terminal equipment. Keyboard 44 enables the user to intervene in transactions as well as carrying out any data processing operation, obviously always in combination with one or several microcircuit cards. It optionally enables use to be made of the possibilities available through connection to a device external of the keyboard console, this device supplying the keyboard console with its own intelligence. The devices shown in FIGS. 4 or 5 can be connected to the public electricity supply or be powered by an internal source such as lithium batteries. The equipment in FIG. 4 is designed to receive a miniature control display 45, which, in the embodiment shown here, is mounted at the side on a pillar provided on the keyboard. This display is completely optional and would not normally be used in the case where other components of the system already include display means.

The equipment shown in FIGS. 4 and 5 can be dedicated entirely to one specific application. They receive the corresponding customization from programmed cards and thus become intelligent control consoles able to adapt to any change in the functionalities of the application to which they are dedicated by simply swapping or replacing cards or by plugging in additional cards which carry the new elements that are specific to the way an application has involved. This keyboard, thus rendered intelligent in practically limitless manner is also capable of replacing any data processing keyboard by means of suitable interfacing.

Finally, the devices in FIGS. 4 and 5 can receive all the accessories and peripherals, notably intelligent connectors, which will be described below.

Figure 6:
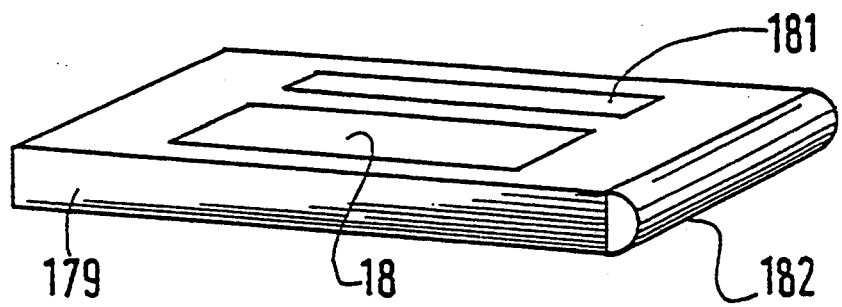
FIG. 6 shows a particularly compact embodiment of a device according to the invention incorporating a peripheral device.

FIG. 6 illustrates a compact or pocket version of a transaction device according to the invention. In this version, the microcircuit cards are wholly contained within the device and are accessible by removing a cover (see FIG. 7) and cannot be seen from outside the equipment. This unit includes the same elements as the device in FIG. 1, notably a touch screen 18 and a display 181. This device is also designed to hold a peripheral such as a remote control unit which is located behind the cover 182, or a modem for example, and which, in all cases, is included inside the device's housing 179.

Figure 7:
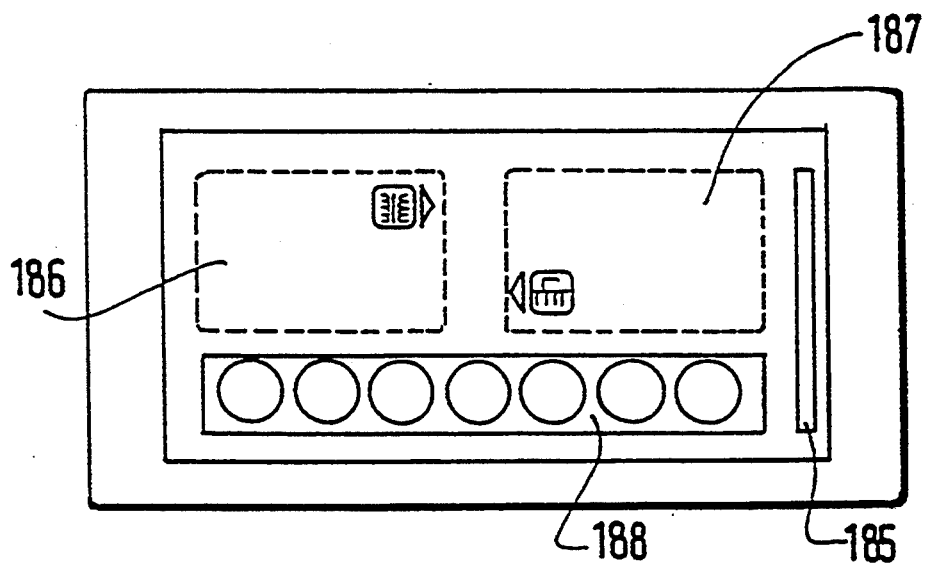
FIG. 7 is a plan view of the device in FIG. 8 after removal of its cover.

FIG. 7 shows the unit of FIG. 6 with the bottom cover removed. The two microcircuit card 186 and 187 can be seen, which are held in place for example by clips, and the batteries 188, for example lithium cells. FIG. 7 also shows a slot 185 enabling an additional microcircuit card to be introduced or any other peripheral whatsoever, notably an intelligent connector which will be described later.

Figure 8:
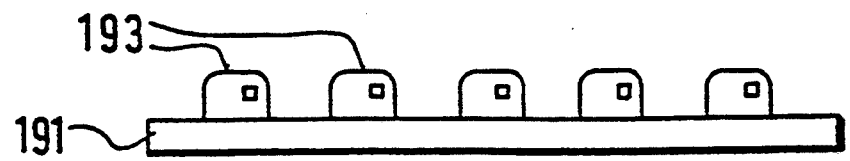
FIG. 8 shows a coupling unit designed to couple together several devices in accordance with the invention.
Figure 9:
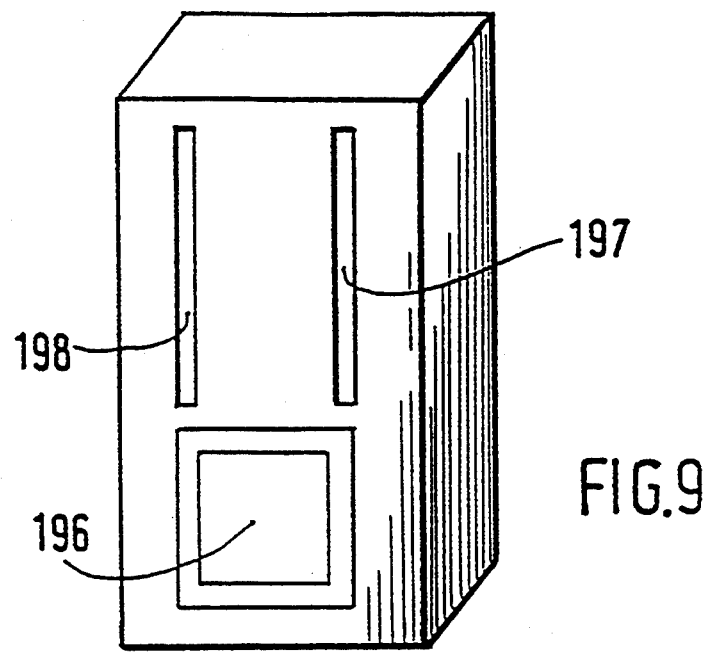
FIG. 9 is an elevational and perspective view of one alternative embodiment of the device according to the invention, designed to be installed inside a fixed cabinet.

FIG. 8 shows, in a very diagrammatical manner, a system for interconnecting several transaction devices, notably those shown in FIG. 9, thus allowing a complete modular system to be built up, each item of equipment, for example 193, being capable of been plugged into a bus bar 191, notably an interconnecting bus which can constitute one of the elements of a rack, for applications in the home automation field, in the fitting out of buildings, in spaces subject to surveillance, etc.

Figure 10:
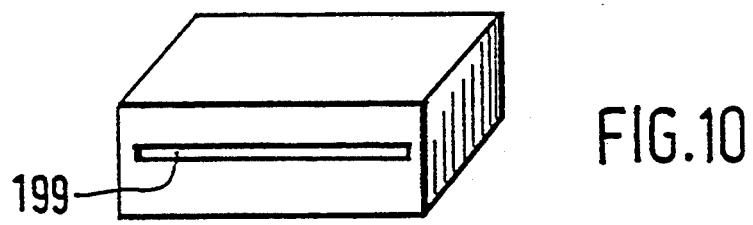
FIG. 10 is a perspective view from below of the device shown in FIG. 9.

FIG. 9 illustrates a transaction device similar to those described previously but intended to be installed inside a fixed cabinet for applications such as home automation, robotics management, decoding systems, highway payment posts, etc. FIG. 9 shows a front view of the equipment, and FIG. 10 shows a plan view of this same equipment showing the slot 199 provided for one of the intelligent connectors which will be described below, and notably designed to allow connection thereof to another transaction device of the same type mounted, for example, in a rack-mounted system. The equipment notably includes slots 198, 197 for introducing two microcircuit cards which confer all the system's intelligence thereto to allow transactions, the drawing up of reports, etc., together with a display 196 supplying information to the user.

A certain number of peripherals which can be used with any one whatsoever of the devices described above, in modular fashion and which are fully compatible with the whole range of devices according to the invention participating in the composition of a whole system will now be described. In order to ensure that a modular system built up from the elements of the invention is correctly managed and that conflicts are avoided, each element, notably those incorporating a microcircuit, have a clearly defined position in a hierarchy of which the master card is normally at the head.

Figure 11:
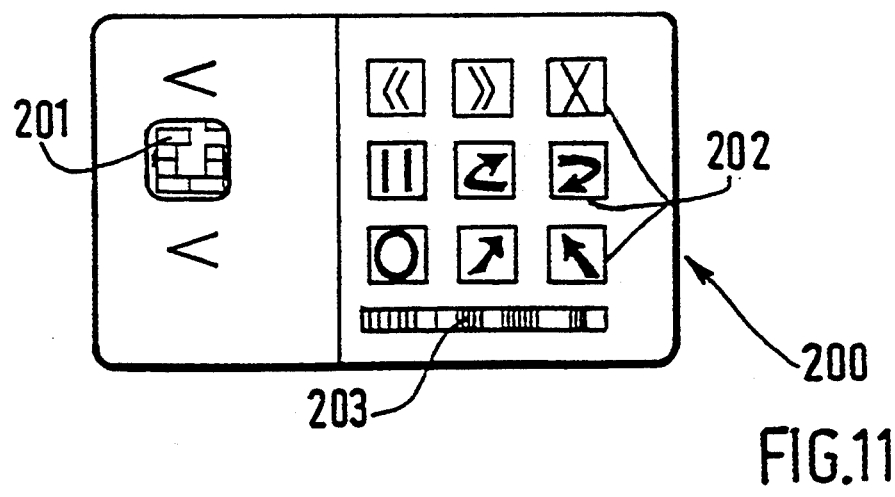
FIG. 11 shows a keyboard in the form of a credit card which can be used with any one whatsoever of the devices according to the invention.

FIG. 11 illustrates a keyboard, substantially of the ISO credit card format incorporating a microcircuit 201 which, among other things, establishes electrical connection between the keyboard and the device into which it is plugged, the device notably powering the keyboard's microcircuit. This keyboard enables a system to be managed, either in a one-off manner for specific interventions, or in a semi-permanent fashion when operator intervention is necessary during the whole duration of a transaction. The keyboard carries a certain number of touch-sensitive keys which are advantageously non-mechanical only requiring very slight pressure to activate them. These keys 202 carry pictograms that illustrate their function, and, optionally, a graduated control 203 suitable for carrying out fine adjustments on a system to which the keyboard is connected.

The keyboard illustrated in FIG. 11 enables a certain number of fundamental operation to be carried out during a transaction. For many of the applications implemented by the means of the present invention, a keyboard that is specific to each application and able to be customized, like all the other elements carrying a microcircuit of the system, is proposed. In a home automation application for example, a keyboard carrying pictograms illustrating the functions each key is able to perform is used, the microcircuit obviously incorporating algorithms corresponding to the functions assigned to each key.

More generally, the keyboard enables an element of the system to be specifically addressed in order to carry out updating, issue supplementary commands during the running of a transaction under the control of another command element, carry out and one-off operations necessitated by some modification to the system, or more permanent functions such as the control of computer games and, as was just mentioned, applications in the home automation field. Many of these keyboard applications require one of the connectors to be described below to be used, which also is able to be plugged into any one whatsoever of the devices of the invention.

More particularly, keyboard 200 constitutes one of the elements for assigning, modifying and deleting delegations assigned to slave (i.e. non-master) cards or any other microcircuit device in the system, including the connectors and the actual keyboard. This also allows new functions to be created, for example in the home automation or computer games fields, systems to be extended by implementation of new functionalities, and notably entitlements to be assigned, modified or deleted in commercial or banking applications.

The plug-in keyboard constitutes one of the "active" elements of a system according to the invention, since it includes its own microcircuit with possibilities for storage, processing, and, optionally, for modifying the content of its own memories. Nevertheless, in a large number of applications, the keyboard remains a control element, meaning that it carries out conventional functions of a keyboard such as data introduction, interrupt generation, issue of enabling signals, etc. In an application that implements a master card as defined above, the keyboard's operation is fully under the control of the programming of said master card. In the same way, in the case of a system that implements a relatively large number of keyboards in the form of customized cards, any absence of compatibility with the other means implemented in the system will prevent the keyboard from operating. The plug-in keyboard can also be inhibited by means of commands issued from a carrier or peripheral that has a higher level in the hierarchy, this notably originating from microcircuit cards that include a security function. Like any keyboard able to be fitted to the system, its use may require the user to introduce a security code, a wrong code or any action recognized as being suspect either causing the keyboard to be inhibited for the particular application considered, or permanently inhibited, meaning that to make it again available for any application, human intervention, typically on the part of the supplier of the service that rendered the keyboard unavailable, is necessary.

For security purposes, the plug-in keyboard can also be inhibited by the user who wishes to protect one or several specific applications. In this case, generally, the user introduces a code or any other indication able to be recognized, the data thus introduced being normally stored in the keyboard's own microcircuit but also being able to involve the microcircuit of another component of the system. As has been said, the keyboard may be highly customized, thus only allowing it to operate in a specific context and for relatively clearly defined purposes.

The plug-in microcircuit keyboard in generally used by plugging it into one of the universal connectors illustrated in FIGS. 13, 14, 15 and 23, one of its functions in this case being to act as a "key" allowing transactions to be carried out between a transaction device 1 and an external application.

Figure 12:
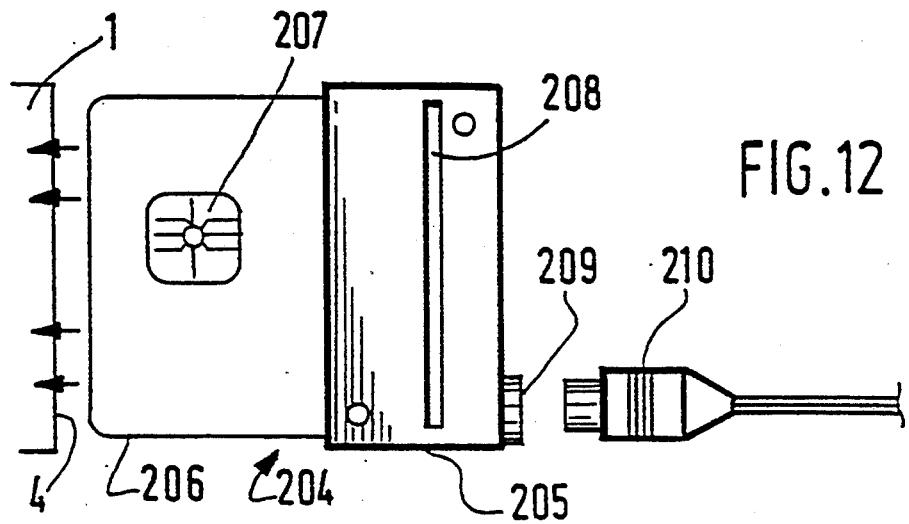
FIG. 12 shows a universal intelligent connector designed to be used with the devices according to the invention and adapted to be able to receive additional intelligence which typically can be provided by software program.

More precisely, and with reference to FIG. 12, when keyboard 200 is plugged into slot or throat 208 it can intervene in relations involving a microcircuit card plugged into the opposite end of device 1 to the slot occupied by keyboard 200. Such an intervention of keyboard 200 is typically represented by the introduction of a code enabling a link to be set up between the card that is plugged into the slot at the other end of the equipment and an external application, along with active intervention during the running of this transaction. In this case as well, non-authorized or suspect use can lead to temporary or permanent inhibition of the keyboard that is plugged in, together, possibly, with a report being drawn up not only in another element of the system but also in the said external application. The connector 204 illustrated in FIG. 12 constitutes one of the key elements of a modular system that can be implemented in accordance with the present invention.

The basic connector illustrated in FIG. 12 consists of a small scale housing 205 carrying a connection system, based, for example, on a DIN socket 209 adapted to be connected to a compatible plug 210 which is directly or indirectly connected to an external application. Housing 205 carries a slot 208 for the introduction of a microcircuit card selected from the various possibilities that the system offers, housing 205 being consequently fitted with a suitable connector for setting up the necessary connections with the lands of the microcircuit incorporated in the microcircuit card thereby ensuring, among other things, electrical powering of said microcircuit card through the plugging in of connector 204 into one of the slots, for example slot 4 of FIG. 12, of the device 1 according to the invention. For this purpose, connector 204 carries a projecting part in the form of a microcircuit card 206, the actual chip or microcircuit being indicated by reference numeral 207.

Figure 23:
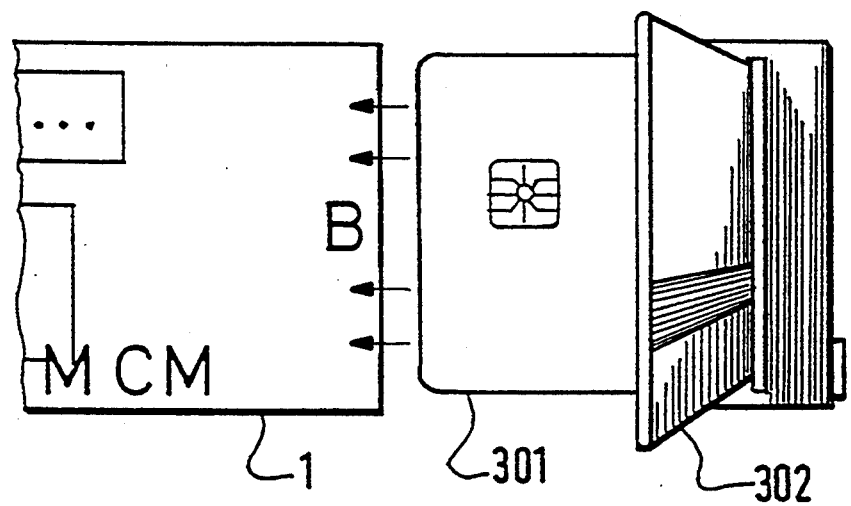
FIG. 23 shows a multiple universal connector with interfaces and an optional connector with a slot for sliding through and reading magnetic stripe cards.

By means of the part 206 shaped like a microcircuit card, connector 204 can be plugged into either one of the slots 4 or 6 in FIG. 1 of a transaction device 1 according to the invention, or even, in the case where two connectors constitute a bridge between several microcircuit carriers or modules according to the invention, into both slots, for example 4 and 6 of FIG. 1; see also FIG. 23 that illustrates a slightly different embodiment of the transaction device 1. The actual connector is completely modular and could, for example, accept another connector 205 being introduced into slot 208.

Apart from another connector or a plug-in keyboard 200 as explained above, slot 208 is also suitable for receiving any one whatsoever of the microcircuit cards discussed above, for example a control card represented by a plug-in keyboard 200 in accordance with FIG. 11 which is highly customized and designed for carrying out fine adjustment or adjustments for matching purposes, for example fine frequency or impedance adjustment in an application directly or indirectly connected to connector 204 by plug 210, using, for example, the graduated regulator 203 in FIG. 11.

The universal connector as illustrated in FIG. 12 constitutes the basic model for a whole range of connectors that are able to intervene in a modular system according to the invention. Apart from several specific applications mentioned earlier, its basic function is to establish relations between at least one microcircuit card plugged into at least of of the slots of the device according to the invention, for example slot 6 in FIG. 1 and/or slot 208 in FIG. 12, and an external application or system which may or may not be connected to a network, via socket 209. Obviously, connector 204 can be fitted with male or female connectors of various formats, all suitable for setting up relations with the outside world. The connector hence constitutes the basis of a whole range of a new type of intelligent connectors capable of recognising other microcircuit modules connected to the same system, and of being recognized by these other modules. The connector is also subject to hierarchical rules, as are all the other elements carrying a microcircuit of a system implemented according to the invention. Differing levels of rights can notably assigned to it, modified and deleted from elements of a higher level in the hierarchy in the system and, notably, by the external application that is linked to the connector by socket 209 and plug 210 in FIG. 12.

For example, the universal connector shown in FIG. 12 makes it possible to link a microcircuit card fitted into slot 208 to an interactive on-line terminal which itself is linked to a centralized system and from which the card can acquire data, thus, for example, allowing the owner to credit the data memory of card 5 with tokens, such as a certain amount of money, originating from his personal banking account which is consequently debited by the same amount. The reverse operation, in other words crediting an account by debiting the card's data memory can of course also be carried out.

It is also of course possible to transmit data from card 5, via the interactive on-line terminal to a card 2 which was in a relation with the on-line terminal, for example via a data transmission network.

In addition to such pure connection function, the universal connector 204 can also carry out functions which involve supplementary facilities; examples of this are typically interfacing with other systems, data conversion, and similar functions. Finally, this connector can also allow conversation to take place with a card that adheres to a different standard to the one able to be exploited by the card readers incorporated into a device such as transaction device 1 of FIG. 1. Notably, the universal connector can be fitted with a slide-through slot for reading magnetic stripe cards, as illustrated in FIG. 23.

Figure 13:
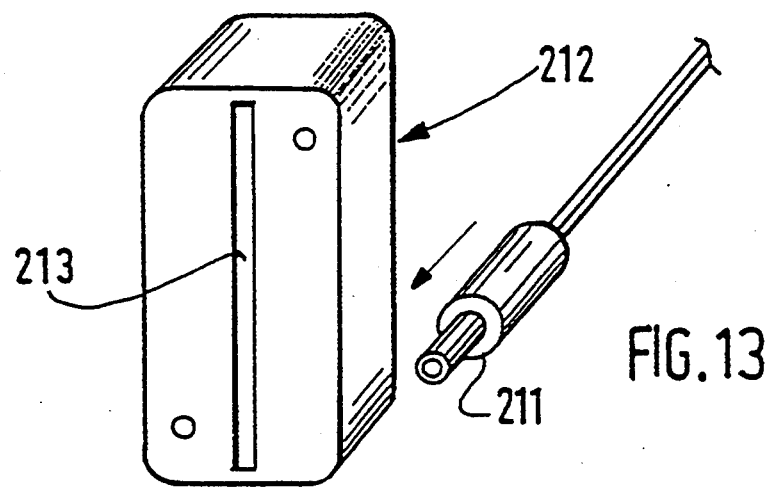
FIG. 13 shows a device similar to the device in FIG. 12 designed to receive a card or a male plug.

FIG. 13 illustrates a connector similar to the one in FIG. 12 but which is adapted to receive a male card in its slot 213 and a male plug 211 in its socket which is not visible in FIG. 13. A connector can obviously include any combination of plugs or sockets, the example in FIG. 13 of a housing 212 being taken by way of illustration. This latter connector, in its basic version, is not fitted with a microcircuit and derives its functionalities from those provided by the microcircuit card, or a part of a card such as indicated by reference numeral 206 in FIG. 12, the function of this connector being rather to set up connections, its level of intelligence being determined by the element that is plugged into its slot 213. The element that is plugged into slot 213 normally, but not obligatorily, is powered by the connector itself or from an external source fed in through connector 211 for example, or from another external source. This is notably the case for one alternative embodiment of a connector in which said connector is designed to be wall-mounted or flush-fitted or mounted onto a support such as a chassis and also adapted to be wired up thus providing power to the element that is plugged into the slot of this connector. However, just like the connector illustrated in FIG. 12, the connector in FIG. 13 can also incorporate its own specific intelligence-providing means taking the form of an element inside housing 212 which is introduced by plugging it in from outside, by fitting it into an internal socket, or any other means. Finally, all the connectors shown in relation with FIGS. 12, 13 and 23 can be fitted with elements enabling the different possible positions of the microcircuit in accordance with the AFNOR or ISO standards discussed above by fitting them out with multiple reading zones.

Obviously, the small transaction device shown in FIG. 1 can, apart from the introduction slots or throats 4 and 6, be fitted with a connector (which is not shown) of the type shown in FIG. 12 or 13. In this case, the user can both carry out transactions between plug-in cards 5 and 2 as well as transactions between one or the other of said cards 5 or 2, and external elements with which they are brought into relation by means of said connector. This for example would enable a retailer possessing a carrier or card 5 which he, for example, introduces into slot 6 to be credited by the amount corresponding to a purchase made by a third party whose card of type 2 or 5 has been introduced into the opposite slot 4, after the mutual compatibility of the cards has been recognized. Obviously, the third party's card would be debited by the corresponding amount. If there was not a sufficient amount in the data memory of the third party's card he could, if necessary, via the connector and the dedicared interface carried in unit 1 and using an interactive on-line terminal or any other means,communicate with a source from which he could withdraw funds from his account, his account being correspondingly debited.

In the same way, the retailer can, thanks to this same item of equipment, credit his own bank account by the amount held in credit in the data memory of his card, said amount being debited from the data memory of his own card.

It is thus possible, using a single piece of equipment, to carry out all the transactions that a trader needs, accompanied by the highest level of reliability and the highest degree of security.

Figure 14:
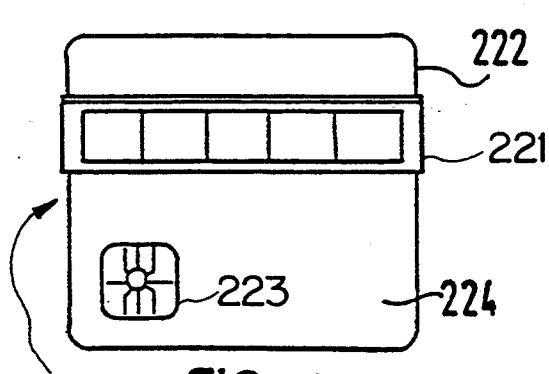
FIG. 14 shows an accessory suitable for being installed on any one of the devices according to the invention and comprising an infrared transmitter/receiver.
Figure 15:
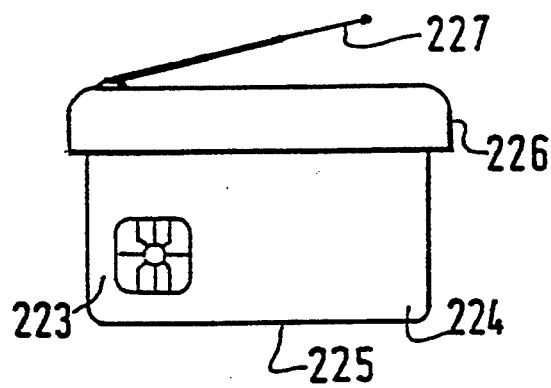
FIG. 15 shows an accessory similar to the one in FIG. 14 but using radioelectric frequency transmission and reception.

FIGS. 14 and 15 show two possible embodiments of a third type of peripheral capable of being connected by a plug-in connection to any other module in the system, notably the transaction device shown in FIG. 1 and the connectors such as those shown in FIGS. 12 and 13. The two devices illustrated in FIGS. 14 and 15 are essentially designed to provide remote control of various devices from a small-size lightweight easy-to-operate module.

Figure 22:
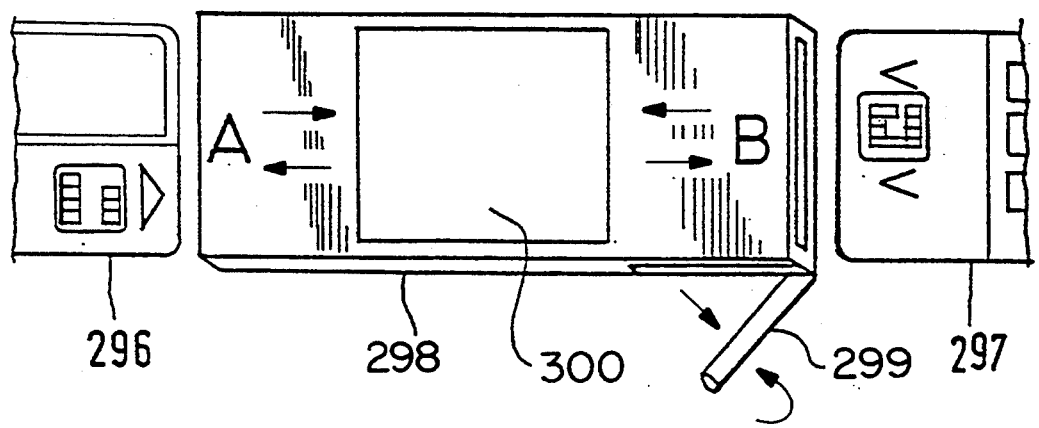
FIG. 22 shows the transaction device of FIG. 1 fitted with a touch screen and an optional external sensor enabling microcircuits that conform to another standard, or another system's design, to be read.

Typically, the peripherals in FIGS. 14 and 15 are plugged into one of the slots, for example slot 4, of a device such as the transaction device shown in FIG. 1, another card for example card 5 in FIG. 1, which is plugged into the other slot 6, determining what operations can be carried out, and authorizing certain operations initiated from the keyboard, for example the keyboard bearing reference numeral 300 on FIG. 22, to be implemented, and being able to draw up reports of operations carried out by the user, and answers received, etc.

Device 220 in FIG. 14 consists of a portion substantially in the form of a part of a credit card 224 incorporating a microcircuit 223 at the top portion of which an infrared transmitter/receiver is fitted, consisting of an electronic module incorporated in a housing 221 on top of which a dome-shaped member 222 incorporates transmitting and receiving means, or at least transmitting means, for coded signals in the infrared frequency band.

Device 225 illustrated in FIG. 15 also includes a portion 224 in the general shape of a part of a credit card incorporating a microcircuit 223 and a housing 226 for an electronic circuit adapted to transmit and/or receive signals coded in the radioelectric frequency band, preferably in the ultra-short wavelength frequency band, by means of an antenna. The electronic transmission and/or reception circuits employed in these two embodiments are relatively low power, and adapted to the coverage zone required of the item of equipment. The two peripherals shown in FIGS. 14 and 15 normally include their own power supply in view of their relatively high power requirements, notably during transmission. They can nevertheless be powered from the power supply of a basic unit such as the one shown in FIG. 1, or from an external power supply. In this case, the transmission and/or reception electronic circuits derive their power via the power supply pads of microcircuit 223 in the same way as the microcircuit itself. In general, in order to increase battery life in the self-powered versions, the power supply of their circuits is inhibited during period of non-use of the peripherals and, advantageously, during periods when transmission or reception is not occurring during their use.

Just like the other elements in the system, the transmission and/or reception peripherals illustrated in FIGS. 14 and 15 are supplied in a customized state, or are able to be customized. The actual microcircuit obviously carries the data relating to the peripheral's specific function, for example a purely transmitting or a send/receive function, the frequency and type of modulation for which they are adapted, elements of transmission protocol, etc. The microcircuit can also carry security elements such as a specific coding law, an encryption mode, decoding algorithms, error detection sequences, etc. The microcircuit can obviously also include means for verifying the user's identity and for preventing any fraudulent or none-authorized use.

Finally, microcircuit 223 generally carries data specific to the use, in other words its rule as a remote control device, as a home automation application controller, "clocking in" elements in a premises surveillance system, or simply as a data transmitter/receiver.

This peripheral, just like the other peripherals in the system, also includes in its microcircuit 223, that data which allows it to recognize the other elements present in a system and to enable it to be recognized by them.

The information contained in microcircuit 223 of the peripheral in FIGS. 14 and 15 in general specifies its operating mode, the possibilities and the limitations applying to its use. To take an analogy with the "Open Systems Interconnect" (OSI) model of the ISO, the functions that are incorporated into this microcircuit represent the lower layer or layers of the OSI model. Less "physical" elements of the peripheral are generally defined by another card, for example card 5, which is plugged into the other slot 6 of device 1 in FIG. 1. This card, which obviously is also highly customized and capable of being customized, can include a series of instructions to be carried out by a device which is being remotely controlled by the device in FIGS. 14 or 15, or, alternately, its presence in transaction device 1 in FIG. 1 can be necessary in order to authorize the user to initiate operations, for example from keyboard 300 in the. device illustrated in FIG. 22.

The transmission and/or reception peripheral can also be employed with the connectors, for example the connectors illustrated in FIGS. 12 and 13. In this case, the data to be transmitted and/or received can be stored in the microcircuit of card 5 in the transaction device 1 in FIG. 1, or they can be introduced from keyboard 300 in the case of the device shown in FIG. 22 or they can be received and/or transmitted via the connector, for example via socket 209 and plug 210 in FIG. 12. In this later case, in other words in the case of use as a remote control which for example is under the control of data originating externally via the plug 210, and with the peripheral in FIG. 14 or 15 introduced into slot 208 in FIG. 12, the presence of a second card, for example card 5 in FIG. 1, is generally necessary. The reason for this is not only that of security but also, along the same lines, for establishing reports of the operations carried out and to maintain a permanent or semi-permanent record thereof.

FIG. 16 illustrates another peripheral that can be used with the system, consisting of an analyser 230 capable of being connected, by means of plug 231, to a universal connector such as the one illustrated in FIG. 12, via socket 209. This analyser is generally designed for setting up a link, either through direct contact or by transmission/reception with the microcircuits fitted into items of electronic hardware. Generally, the analyser, which is reserved for exclusive use by professional repairmen, developers, etc. and which in general requires a card authorizing access to the system to be simultaneously present, is designed to allow direct contact with PROM-type microcircuits located in items of electronic hardware which are designed to allow repair or checking to be rapidly effected through simple contact. When connected up to the device in FIG. 1 by means of a connector such as the one shown in FIG. 12, analyser 230 enables the functions of a microcircuit to which it is applied to be tested. This is achieved in accordance with a test sequence that is for example stored in card 5 which is plugged into the item of equipment according to FIG. 1. As the system is modular, analyser 230 can be connected into a system, by means of a suitable connector, which is also in its turn connected by means, for example, of plug 210 in FIG. 12, to an external interactive on-line application. Connections of this type allow remote diagnosis and repair to be carried out via an optional local or remote system.

The analyser shown in FIG. 16 essentially consists of a body 230 enabling it to be manipulated manually. This body 230 has an extending tip 232 designed to receive a removable and replaceable head 233. A specific removable head is designed to fit each PROM microcircuit format, and the use of a specific head also makes it possible to set up a link with a microcircuit conforming to a new standard or having a special format.

The analyser described above is normally employed in combination with the centering guide 235 illustrated in FIG. 17. Generally, the centering guide is fitted in place when the PROM microcircuit is installed by means of lugs 236 which are fixed onto the microcircuit 223 carried by flexible carrier 224 but it can obviously be added to a circuit which is not already pre-fitted with centering means. Its purpose is to ensure that the tip 234 of the analyser's probe is correctly centered and that correct connections are made to the contacts of the microcircuit concerned.

The analyser illustrated in FIG. 16 is designed to be connected to the socket 209 at least of the universal connector in FIG. 12 by means, for example, of a DIN plug 231. A debug or test sequence can be stored in a card such as the card 5 illustrated in FIG. 1, and a keyboard such as the one illustrated in FIG. 11 can be plugged into the slot 208 of universal connector 204 in FIG. 12 and used to start up a series or sequence of tests in combination with display of messages providing guided fault-finding, on the screen 300 of a device illustrated in FIG. 22, the results also being displayed on said screen 300 and the results of the tests being recorded in a part of the memory of cards 5 in FIG. 1. This is just an illustration of a typical use of analyser 230, but fault-finding can also be guided or driven by an external system which is also connected up to a socket similar to socket 209 in FIG. 12, together with the possibility of storing the results in a card such as card 5 of FIG. 1. As the system is fully modular, various hardware combinations are possible. Nevertheless, the hierarchical structure of the elements of the system and the need for strict compatibility between them, and, in general, the requirement to have a card that is capable of "unlocking" an application's implicit protective measures present makes the system particularly reliable as regards its security and absence of conflict: every conflict situation means that an element having its own identity in the system is absent, such absence preventing operation and an indication as to the said absence being, or not being displayed.

As illustrated in FIG. 16, analyser 230 is directly connected to universal connector 204 of FIG. 12 by means of a DIN plug. The use of the analyser obviously requires at least one microcircuit card or similar module to be simultaneously present, containing the software, access rights and identifying means that are specific to this analyser. Analyser 230 can, obviously, either be connected to the system by means of a connector of the plug-in microcircuit card type or it can incorporate at least part of its software in the body 230 of the analyser.

FIGS. 18 and 19 show two further peripherals which are capable of being connected to the system. FIG. 18 shows a touch-sensitive control fitted with several touch keys 241 mounted on a housing 244. This control may or may not include its own power supply. It too includes an electronic circuit mounted on a carrier 242 also in the form of a credit card with a microcircuit 243 incorporated in the carrier. Control device 240 is essentially employed in applications such as home automation for functions such as switching devices directly or indirectly connected to the system on or off, or progressive control in steps by repeated actuations, etc. Control 240 can also perform the function of a security device, housing 244 containing circuits that function in cooperation with microcircuit 243 and, optionally, other circuits in a modular system that allow a user who presses one of keys 241 to be recognized by touch. In this case, the recognition algorithms will normally be held in microcircuit 243, data having been entered by appropriate steps taken by for example, the user himself, to enable him to be re-recognized by touch.

FIG. 19 also shows an on-off control 245 essentially consisting of a carrier 242 incorporating a microcircuit 243 above which housing 246, which incorporates a presence detection circuit, is arranged. This presence detector 245 can act as an on-off control for a modular system of which it constitutes a part or, particularly in the areas of security and home automation, this presence detector can also have a protective function, or be used to detect the presence of unauthorized persons, the circuits contained in housing 246 being either of the static or the sweep type.

Figure 20:
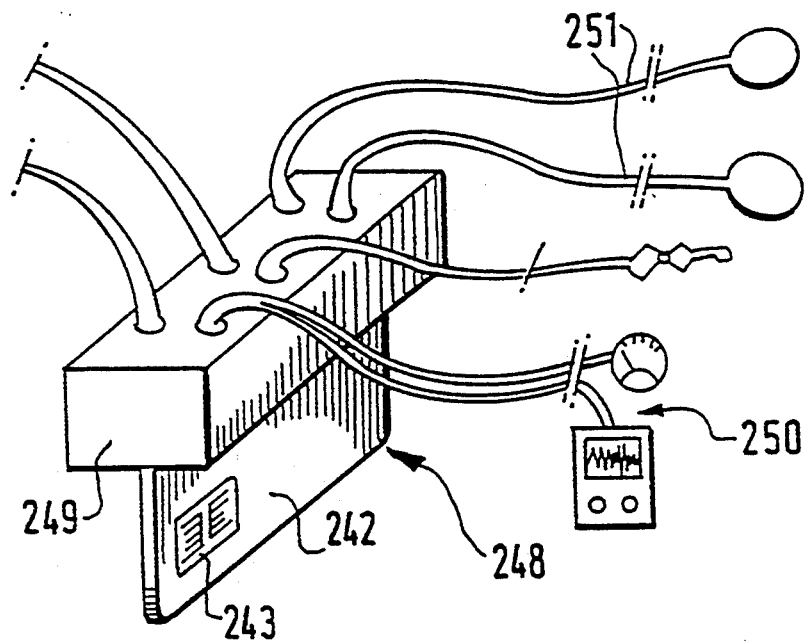
FIG. 20 is a diagrammatical representation of an accessory able to be used with the devices according to the invention, this accessory comprising a connector able to connect up monitoring equipment such as items of medical equipment.

FIG. 20 illustrates a final example of a peripheral able to connected up to a modular system by means of its male connection portion 242 with incorporated microcircuit 243. The device illustrated in FIG. 20 is a connector 248 which is dedicated to a specific task such as medical monitoring, via its sensors 251 which are shown in a highly diagrammatical manner by way of example, or has specific functions in the testing, checking and monitoring areas in laboratories factory workshops, etc., providing a connection for measuring equipment such as those shown also highly diagrammatically by reference numeral 250.

Figure 21:
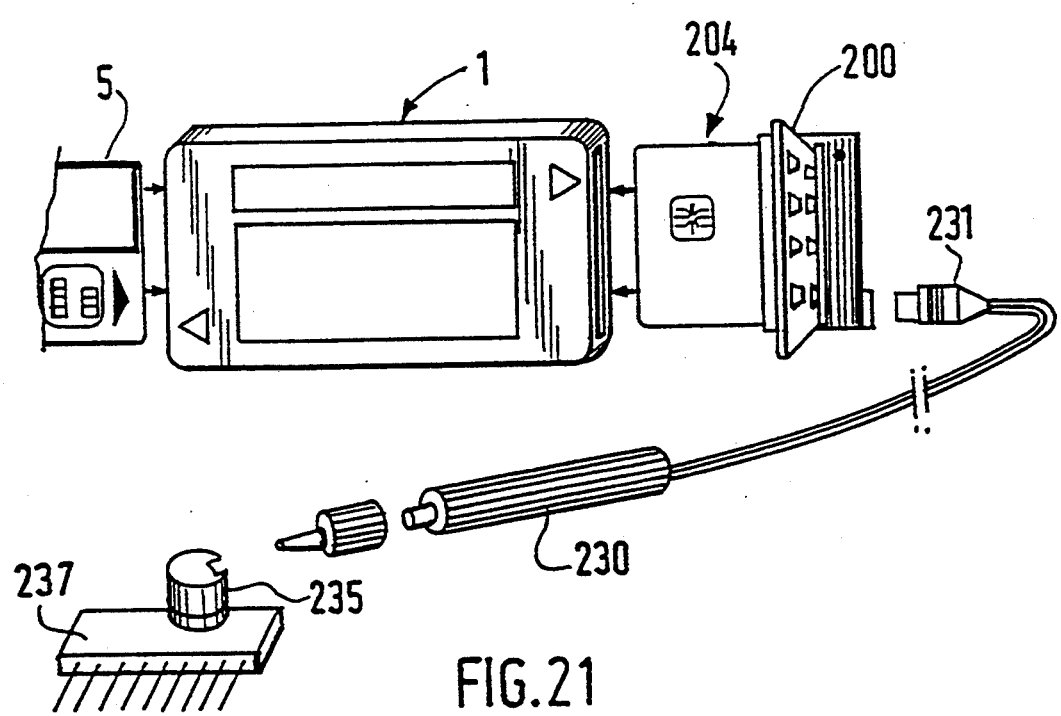
FIG. 21 shows the modular structure of a system that incorporates several accessories according to the invention.

In order to illustrate the possibilities for customization and for building up completely modular systems made possible by the invention, a typical application which employs the analyser in FIG. 16 will now be considered. The application, which is illustrated in FIG. 21, relates to fast trouble-shooting or fine tuning of domestic appliances such as new generation television sets. For fast trouble-shooting and/or adjustment, the television set is pre-fitted by the manufacturer with a fast trouble-shooting chip 237 with the guide ring 235 from FIG. 17 already in place allowing access to a microcircuit. Obviously, guide ring 235 is normally protected, for example by means of a cap, in its normal non-utilized situation. For each model that is thus equipped, the manufacturer also provides a dedicated card containing testing software and test sequences, and which constitutes the "master" card. This is for example card 5 which is introduced into slot 6 of the item of equipment 1 in FIG. 1. The other slot 4 receives the connector shown in FIG. 12, this connector, despite the fact that it is intelligent, being a general-purpose connector able to recognise the type of card that is plugged into the other slot 6 of the piece of equipment 1 without introducing supplementary functionalities. Analyser 230 of FIG. 16 is connected up to universal connector 204 by means of its connector 231. The user selects the interchangeable head 233 which corresponds to the indications carried, for example, on centring ring 235 of FIG. 17. Slot 208 of universal connector 204 can receive a card which supplements the main card plugged into slot 6 in FIG. 1, which, for example, can be the television set's guarantee card, a control card, a servicing card or any other supplementary card that adds to the function of the main card in the case of a new version of the television set or a change in the functionalities thereof. In this way, generally speaking, the serviceman can handle some aspect which is not covered by the main card but in perfect cooperation therewith. Just like the applications considered previously, card 5 will generate a series of messages and options on a liquid crystal display, the serviceman following the instructions and choosing the options which are proposed to him.

FIGS. 22 and 23 illustrate slightly differing embodiments and possibilities of integration of the basic unit 1 of FIG. 1. FIG. 22 illustrates a multi-card manager 298 similar to the device illustrated in FIG. 1 and fitted with a liquid crystal touch-sensitive or similar display 300, the display that is specific to the application concerned being generated by one of the cards that can be plugged in 296 or 297. This embodiment is also fitted with an extendible probe 299 which operates along the same lines as the probe in FIG. 21 and allows reading, writing, or other transactions between one of the cards 296 or 297 plugged into device 298 and a microcircuit that is integrated into a carrier which adheres to a different standard or is integrated into a piece of equipment. Obviously, the presence of one of the cards 296, 297 is obligatory in order to be able to carry out this operation, in order to supply the necessary "intelligence".

FIG. 23, which was briefly discussed above, shows a universal connector 301 from FIG. 12 fitted with a "swipe" card reader for a magnetic stripe card 302.

We claim:

1. A transaction device for carrying out transactions between at least one first plug-in data carrier having a microcircuit and a second data carrier, said transaction device independent and separate from said first plug-in data carrier and said second data carrier, said transaction device comprising:
a first contact section which establishes electrical contact with said first plug-in data carrier;
a second contact section which establishes electrical contact with said second data carrier;
a first memory section inputting and outputting data to said first plug-in data carrier via said first contact section;
a second memory section inputting and outputting data to said second data carrier via said second contact section; and
an interfacing circuit identifying, under the control of said first plug-in data carrier, whether said second data carrier is compatible with said first plug-in data carrier, and establishing a data transfer link under the control of said first plug-in data carrier between said first plug-in data carrier and said second data carrier when said second data carrier is identified as compatible with said first plug-in data carrier.

2. A device according to claim 1, wherein said second data carrier is a connector, said connector including at least one slot enabling a plug-in data carrier having a microcircuit to be introduced thereinto, and said connector including a port for allowing communication to be carried out between a peripheral or an external system and at least one of said first plug-in data carrier and a plug-in data carrier introduced into said slot.

3. A device according to claim 2, wherein said connector includes a connecting portion for electrically connecting said connector to said transaction device, and said connected portion is a plug-in data carrier having a microcircuit.

4. A device according to claim 2, wherein said connector is provided with a microcircuit carried on a part which is in the shape of a credit card.

5. A device according to claim 2, wherein said connector is provided with a microcircuit of a male element in the general shape of a credit card which is plugged into said slot provided on said connector.

6. A device according to claim 2, wherein said connector includes an additional permanent or movable intelligence-providing data carrier.

7. A device according to claim 2, wherein said port is connected to an external system, and said external system is an analyser generally in the form of a probe capable of setting up a direct or indirect contact with the contacts of a microcircuit.

8. A device according to claim 7, wherein said analyser is used with a centring guide ring enabling the contacts of said microcircuit to be correctly addressed and adapted to be fix onto said microcircuit.

9. A device according to claim 1, wherein said first plug-in data carrier controls data transfer between said first plug-in carrier and said second data carrier via said data transfer link.

10. A device according to claim 1, wherein
said first contact section includes a plurality of contacts, each contact positioned to correspond to a predetermined format of said first plug-in data carrier, and each contact establishing one of direct and indirect electrical contact;
said first memory section includes a plurality of memories, each memory corresponding to a contact of said first contact section;
said second contact section includes a plurality of contacts, each contact positioned to correspond to a predetermined format of said second data carrier, and each contact establishing one of direct and indirect electrical contact; and
said second memory section includes a plurality of memories, each memory corresponding to a contact of said second contact section.

11. A device according to claim 1, further comprising a display displaying elements of information relative to said data transfer.

12. A device according to claim 11, wherein said display is controlled by one of said first plug-in data carrier and said second data carrier.

13. A device according to claim 1, further comprising an instruction entry section which enables an operator to intervene in said data transfer.

14. A device according to claim 1, further comprising a liquid crystal display which is driven by one of said first plug-in data carrier and said second data carrier.

15. A device according to claim 1, further comprising a keyboard with a touch sensitive screen which is driven by one of said first plug-in data carrier and said second data carrier.

16. A device according to one of claim 1, further comprising a connector which connects said transaction device to an external keyboard.

17. A device according to claim 1, further comprising a magnetic stripe reader which reads a magnetic stripe card.

18. A device according to claim 1, further comprising:

a plurality of contact sections, each contact section for establishing electrical contact with a plug-in data carrier;

a plurality of memory sections corresponding to each contact section, each memory section inputting and outputting data to a plug-in data carrier; and wherein said interface circuit, connected to said plurality of memory sections, identifies whether a plurality of plug-in data carriers electrically contacted by said plurality of contact sections are compatible with said first plug-in data carrier, and establishing data transfer links between said first plug-in data carrier and plug-in data carriers of said plurality of plug-in data carriers identified as compatible with said first plug-in data carrier.

19. A device according to claim 1, further comprising:
a housing which encases said first and second contact sections, said first and second memory sections, and said interface circuit, said housing including a first and second slot for receiving said first and second data carrier so that said first and second contact sections can establish electrical contact with said first and second data carriers, respectively.

20. A device according to claim 1, further comprising:
a housing which encases said first and second contact sections, said first and second memory sections, and said interface circuit, said housing including a first and second face substantially parallel to one another, said first face including a first and second portion for receiving said first and second data carriers so that said first and second contact sections can establish electrical contact with said first and second data carriers, respectively, and so that said first and second data carriers are substantially parallel to said first face.

21. A device according to claim 20, wherein said second face includes a display and a touch sensitive screen which are driven by said first plug-in data carrier.

22. A device according to claim 1, wherein said second data carrier is a plug-in data carrier having a microcircuit.

23. A plug-in data carrier, comprising:
a processor;
a program memory connected to said processor; and
a dedicated memory connected to said processor, said dedicated memory being divided into a plurality of regions including a region for controlling and managing the operation of a transaction device which is a device independent of said plug-in data carrier and includes
a first contact section which establishes electrical contact with said plug-in data carrier,
a second contact section which establishes electrical contact with another data carrier,
a first memory section inputting and outputting data to said plug-in data carrier via said first contact section,
a second memory section inputting and outputting data to said another data carrier via said second contact section, and
an interfacing circuit identifying, under control of said plug-in data carrier, whether said another data carrier is compatible with said plug-in data carrier, and establishing a data transfer link, under the control of said first plug-in data carrier between said plug-in data carrier and said another data carrier when said another data carrier is identified as compatible with said plug-in data carrier.

24. A method for effecting a transaction between at least one first plug-in data carrier having a microcircuit and at least one second data carrier, said method comprising the steps of:
(a) providing, independent of said first plug-in data carrier, a transaction device;
(b) identifying, via said transaction device under the control of said first plug-in data carrier, compatibility between said first plug-in data carrier and said second data carrier;
(c) transferring, as controlled by said first plug-in data carrier, data between said first plug-in data carrier and said second data carrier via said transaction device when said step (b) determines that said second data carrier is compatible with said first plug-in data carrier.

25. The method of claim 24, wherein said step (c) includes the steps of (c1) setting up, via an interface circuit in said transaction device, a link between said first plug-in data carrier and said second data carrier, (c2) accessing data in said first plug-in data carrier as authorized by said first plug-in data carrier, and (c3) transferring said accessed data to said second data carrier.

26. The method of claim 25, wherein said step (c) includes the steps of (c1) receiving operator instructions via one of said transaction device and said first plug-in data carrier, (c2) accessing data in one of said first plug-in data carrier and said second data carrier as authorized by said first plug-in data carrier and as instructed by said operator instructions, and (c3) transferring said accessed data to the other of said second data carrier and said first plug-in data carrier.

27. The method of claim 26, wherein said step (a) provides said transaction device with a keyboard, and said step (c1) includes receiving operator instructions via said keyboard.

28. The method of claim 26, wherein said step (c1) includes receiving operator instructions via a keyboard included in said first plug-in data carrier.

29. The method of claim 24, wherein one of said first plug-in data carrier and said second data carrier includes a receiving unit for receiving instructions, and said step (c) includes the steps of (c1) receiving instructions via said receiving unit, (c2) transferring data, corresponding to a condition met by said received instructions, between said first plug-in data carrier and said second data carrier.

30. The method of claim 24, wherein
said step (c) transfers data from said first plug-in data carrier to said second data carrier via said transaction device when said step (b) determines that said second data carrier is compatible with said first plug-in data carrier, and said second data carrier is a plug-in data carrier having a microcircuit authorized to receive data transferred from said first plug-in data carrier; and further comprising the steps of,
(d) making data received by said second data carrier in step (c) secure; and
(e) controlling transfer of data stored in said second data carrier based on data received by said second data carrier in step (c).

31. A method according to claim 24, wherein said second data carrier comprises a data carrier which is also in the form of a plug-in microcircuit element, said second data carrier being able to receive data during a transaction only when said first plug-in data carrier is authorized to send data thereto, the data actually transferred being able to be limited by defined degree of authorization.

32. A method according to claim 24, wherein said first plug-in data carrier draws up a report of each transaction in which it has participated.

33. A method according to claim 24, wherein
said step (a) includes the steps of,
(a1) establishing a direct or indirect electrical contact between terminals of the microcircuit of said first plug-in carrier and said transaction device;
(a2) establishing a direct or indirect electrical contact between terminals of a microcircuit of at least one second data carrier and said transaction device, to establish a link, through said transaction device between said microcircuits of said first plug-in data carrier and said second microcircuit; and
said step (b) including the steps of,
(b1) running an identification and access algorithm on said microcircuit of said first plug-in data carrier;
(b2) running an identification and access algorithm on said microcircuit of said second data carrier;
(b3) transferring the data resulting from said steps (b1) and (b2) to said transaction device;
(b4) comparing, in said transaction device, the results of said steps (b1) and (b2) by a method determined by said first plug-in data carrier;
(b5) determining if a transaction is possible on the basis of the results of said step (b4).

34. The method of claim 3, wherein said step (c) comprises the steps of (c1) sending, when said second data carrier is compatible with said first plug-in data carrier, activation signals to activate a means for operator intervention, (c2) receiving operator instructions via said means for operator intervention when activated, and (c3) carrying out data transfer between microcircuits of said second data carrier and said first plug-in data carrier under control of said microcircuit of said first plug-in data carrier and said received instructions.

35. A connecting device, comprising:
a connecting portion for electrically connecting said connecting device to a contact section of an interface device, said interface device including an interfacing circuit identifying, under control of a first plug-in data carrier connected to a second contact section, whether said connecting device is compatible with said first plug-in data carrier, and controlling data transfer between said first plug-in data carrier and said connecting device via said interfacing circuit under overall control of said first plug-in data carrier when said connecting device is identified as compatible with said first plug-in data carrier; and
at least one slot for receiving a second plug-in data carrier so that said interface device can transfer data between said first and second plug-in data carriers.

36. A device according to claim 35, wherein said connecting portion is a plug-in data carrier having a microcircuit.

37. A device according to claim 36, wherein said connecting portion is in the shape of a credit card.

38. A device according to claim 35, wherein said connector includes one of a male or female connector for connection to an external system so that said interface device can transfer data between said first plug-in carrier and said external system.

* * * * *